US010028630B2

(12) United States Patent
Cho

(10) Patent No.: US 10,028,630 B2
(45) Date of Patent: Jul. 24, 2018

(54) CLEANER

(71) Applicant: Samsung Electronics Co., Ltd., Suwon-si (KR)

(72) Inventor: Dong Jin Cho, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 71 days.

(21) Appl. No.: 14/879,316

(22) Filed: Oct. 9, 2015

(65) Prior Publication Data
US 2016/0106282 A1    Apr. 21, 2016

(30) Foreign Application Priority Data
Oct. 15, 2014 (KR) .................. 10-2014-0139233

(51) Int. Cl.
B01D 45/00 (2006.01)
A47L 9/16 (2006.01)
(Continued)

(52) U.S. Cl.
CPC .............. A47L 9/1608 (2013.01); A47L 9/12 (2013.01); A47L 9/1633 (2013.01);
(Continued)

(58) Field of Classification Search
CPC ........ A47L 9/1608; A47L 9/12; A47L 9/1683; A47L 9/1633; A47L 9/1666; B04C 5/10; B04C 5/13; B04C 5/26; B01D 45/12
See application file for complete search history.

(56) References Cited

U.S. PATENT DOCUMENTS 3,200,568 A * 8/1965 McNeil .................... B07B 7/08
                                                     55/459.1
5,078,761 A * 1/1992 Dyson .................. A47L 9/1633
                                                      55/337
(Continued)

FOREIGN PATENT DOCUMENTS

EP        1 726 245         11/2006
KR    10-2014-0019743        2/2014

OTHER PUBLICATIONS

Espacenet Bibliographic data: US2007079579 (A1)—Apr. 12, 2007 (Jul. 31, 2015).
(Continued)

Primary Examiner — Dung H Bui
(74) Attorney, Agent, or Firm — Staas & Halsey LLP

(57) ABSTRACT

A cleaner including a dust collection unit configured to separate dust from air through centrifugation is provided. The dust collection unit includes a dust collection case having an inlet through which air is introduced and an outlet through which the air is discharged, and a cyclone assembly located in the dust collection case to separate dust from the air introduced through the inlet. The cyclone assembly includes a dust separation housing having an inner space, configured to have a first introduction unit formed at a side surface thereof; and an air curtain generation member coupled to the dust separation housing at a lower part of the first introduction unit, configured to include an air curtain discharge unit arranged at one upper end thereof so that the air curtain discharge unit allows vertical airflow ascending along the first introduction unit to be discharged.

15 Claims, 14 Drawing Sheets

(51) Int. Cl.
*B01D 45/12* (2006.01)
*A47L 9/12* (2006.01)
*B04C 5/26* (2006.01)
*B04C 5/10* (2006.01)
*B04C 5/13* (2006.01)

(52) U.S. Cl.
CPC .......... *A47L 9/1666* (2013.01); *A47L 9/1683* (2013.01); *B01D 45/12* (2013.01); *B04C 5/10* (2013.01); *B04C 5/13* (2013.01); *B04C 5/26* (2013.01)

(56) References Cited

U.S. PATENT DOCUMENTS

| | | | | |
|---|---|---|---|---|
| 6,195,835 | B1* | 3/2001 | Song | A47L 9/104 15/327.1 |
| 7,140,068 | B1* | 11/2006 | Vander Baan | A47L 5/28 15/347 |
| 7,771,499 | B2* | 8/2010 | Oh | A47L 9/1625 55/343 |
| 2003/0159238 | A1* | 8/2003 | Oh | A47L 9/1666 15/353 |
| 2003/0208879 | A1* | 11/2003 | Oh | A47L 9/20 15/352 |
| 2003/0213091 | A1* | 11/2003 | Oh | A47L 9/104 15/353 |
| 2003/0221280 | A1* | 12/2003 | Oh | A47L 9/104 15/353 |
| 2004/0010885 | A1 | 1/2004 | Hitzelberger et al. | |
| 2005/0160554 | A1* | 7/2005 | Ueyama | A47L 9/1608 15/353 |
| 2006/0037172 | A1* | 2/2006 | Choi | A47L 9/1683 15/353 |
| 2006/0130441 | A1* | 6/2006 | Oh | A47L 9/1666 55/337 |
| 2006/0168922 | A1* | 8/2006 | Oh | A47L 9/1666 55/337 |
| 2006/0236663 | A1* | 10/2006 | Oh | A47L 9/1608 55/337 |
| 2006/0254226 | A1* | 11/2006 | Jeon | A47L 9/1625 55/345 |
| 2007/0039292 | A1* | 2/2007 | Oh | A47L 9/1658 55/337 |
| 2007/0079579 | A1 | 4/2007 | Eddington et al. | |
| 2007/0079581 | A1* | 4/2007 | Kim | A47L 9/1625 55/345 |
| 2007/0119129 | A1* | 5/2007 | Jeon | A47L 9/1608 55/337 |
| 2007/0294856 | A1* | 12/2007 | Park | A47L 5/28 15/347 |
| 2008/0264017 | A1* | 10/2008 | Oh | A47L 9/1608 55/457 |
| 2008/0302071 | A1 | 12/2008 | Strutt et al. | |
| 2009/0007369 | A1* | 1/2009 | Gomiciaga-Pereda | A47L 9/1633 15/347 |
| 2009/0007370 | A1 | 1/2009 | Gomiciaga-Pereda et al. | |
| 2009/0031524 | A1* | 2/2009 | Courtney | A47L 9/1625 15/347 |
| 2009/0113663 | A1 | 5/2009 | Follows et al. | |
| 2009/0133370 | A1* | 5/2009 | Yoo | A47L 9/1633 55/429 |
| 2009/0193771 | A1* | 8/2009 | Oh | A47L 9/1633 55/337 |
| 2009/0313958 | A1* | 12/2009 | Gomiciaga-Pereda | A47L 5/24 55/317 |
| 2011/0225764 | A1* | 9/2011 | Muhlenkamp | A47L 9/1666 15/347 |
| 2012/0210537 | A1* | 8/2012 | Makarov | A47L 9/1608 15/353 |
| 2013/0091815 | A1* | 4/2013 | Smith | A47L 9/102 55/346 |
| 2014/0215751 | A1* | 8/2014 | Kasper | A47L 9/104 15/347 |

OTHER PUBLICATIONS

Espacenet Bibliographic data: US2009007370 (A1)—Jan. 8, 2009 (Jul. 31, 2015).
Espacenet Bibliographic data: US2004010885 (A1)—Jan. 22, 2004 (Jul. 31, 2015).
Espacenet Bibliographic data: US2008302071 (A1)—Dec. 11, 2008 (Jul. 31, 2015).
Espacenet Bibliographic data: US2009113663 (A1)—May 7, 2009 (Jul. 31, 2015).
European Office Action dated Apr. 10, 2017 in corresponding European Application No. 15 189 418.5.
Rule 71(3) Communication dated Jan. 4, 2018 in corresponding European Patent Application No. 15 189 418.5, 42 pages.

* cited by examiner

CLEANER

CROSS-REFERENCE TO RELATED APPLICATIONS

This application is related to, and claims the priority benefit of, Korean Patent Application No. 10-2014-0139233, filed on Oct. 15, 2014 in the Korean Intellectual Property Office, the disclosure of which is incorporated herein by reference.

BACKGROUND

1. Field

Embodiments relate to a cleaner including a cyclone dust collection unit.

2. Description of the Related Art

Generally, a cleaner is a device that suctions dust and foreign substances scattered on a surface to be cleaned together with air using suction force, filters the dust and foreign substances from the suctioned air, and discharges purified air to the outside.

Cleaners having the above function may be classified into a canister-type cleaner in which a main body and a suction nozzle are separated from each other and communicate with each other through a predetermined pipe, and an upright-type cleaner in which a suction nozzle and a main body are integrated.

The cleaner includes a drive unit to generate suction force, a suction part to suction air on a surface to be cleaned using suction force of the drive unit, and a dust collection unit to filter dust from the air suctioned through the suction part and discharge purified air to the outside.

A cyclone dust collection units from among the dust collection units, which is a dust collector that separates dust from the suctioned air using centrifugal force, is widely used since it is semipermanently usable and more hygienic and convenient than other dust collectors that employ a dust bag.

The cyclone dust collection unit is applicable to other types of cleaners including a canister type cleaner, an upright type cleaner, and a hand type cleaner, irrespective of the shape or category of the cleaners.

The cyclone dust collection unit may include at least one cyclone. At least one cyclone may separate dust from the air introduced into the cyclone dust collection unit using centrifugal force. The cyclone forms an internal swirling airflow to separate dust from the suctioned air, moves the air having no dust to another outlet or another cyclone, so that the dust is secondarily filtered. In this case, pure air and the swirling airflow are partially mixed, so that the air having dust moves to the outlet or another cyclone, resulting in reduction of dust filtering efficiency.

SUMMARY

It is an aspect of at least one embodiment to provide a cleaner having an improved structure to increase the efficiency of separating dust from the suctioned air.

It is an aspect of at least one embodiment to provide a cleaner having an improved structure to prevent pure air having no dust from being mixed with air having no dust in a dust collection unit.

Additional aspects of the embodiments are set forth in part in the description which follows and, in part, will be obvious from the description, or may be learned by practice of the invention.

An aspect of of an embodiment provides a cleaner including a dust collection unit to separate dust from air through centrifugation, the dust collection unit including a dust collection case having an inlet through which air is introduced and an outlet through which the air is discharged, and a cyclone assembly located in the dust collection case to separate dust from the air introduced through the inlet. The cyclone assembly includes a dust separation housing having an inner space, having a first introduction unit formed at a side surface thereof, and an air curtain generation member couplable to the dust separation housing at a lower part of the first introduction unit, configured to include an air curtain discharge unit at one upper end thereof so that the air curtain discharge unit allows vertical airflow ascending along the first introduction unit to be discharged.

The air curtain generation member may include a second introduction unit through which air may be introduced, at a lower end of the air curtain generation member, wherein the second introduction unit may be formed to have a larger area than the air curtain discharge unit.

The air curtain generation member may be formed to have a larger cross-section with decreasing distance to a bottom part thereof.

The air curtain discharge unit may be arranged at a position where the air curtain discharge unit encloses a lower end of the first introduction unit.

The first introduction unit may include a first filter member to separate dust from the air flowing into the dust separation housing.

The second introduction unit may include a second filter member to separate dust from the air flowing into the air curtain generation member.

The first filter member may be configured to filter out finer dust than the second filter member.

Each of the first filter member and the second filter member may include a mesh.

The cyclone assembly may include an introduction pipe in an inner space of the dust separation housing, to include a first flow passage therein, a guide unit at one side of the introduction pipe, to allow the air moved through the introduction pipe to be discharged to an inner space of the dust collection case, and an airflow formation unit provided at one side of the guide unit in such a manner that the air discharged from the guide unit forms a swirling airflow.

The cyclone assembly may include a second flow passage disposed between the introduction pipe and the dust separation housing, and a discharge outlet provided at one end of the dust separation housing, configured to communicate with the second flow passage, wherein the discharge outlet is formed to communicate with the outlet of the dust collection case.

The cyclone assembly may include a plurality of dust separation units each having an inner space to separate dust from the air, and a guide pipe to direct the air from the discharge outlet to the inner spaces of the dust separation units.

An aspect of an embodiment provides a cleaner including a dust collection unit to separate dust from air through centrifugation. The dust collection unit includes a dust collection case having an inlet through which air may be introduced and an outlet through which the air may be discharged, and a dust separation unit located in the dust collection case, to centrifugally separate the dust from the air by generating a swirling airflow. The dust separation unit includes a dust separation housing in which a first introduction unit communicating with an inner space may be provided at a side surface thereof, and an air curtain generation member, one side of which may be coupled to the dust separation housing, to generate an ascending airflow rising along an outer circumference of the first introduction unit. The air curtain generation member provides the ascending airflow in a manner that the swirling airflow generated in the dust collection case may be prevented from moving to the first introduction unit.

The air curtain generation member may include an air compression unit formed therein, an air curtain discharge unit above the air compression unit, and a second introduction unit below the air compression unit, wherein a cross section of the second introduction unit may be larger in size than the air curtain discharge unit.

The air curtain generation member may be formed to have a larger cross-section with decreasing distance to a bottom part thereof.

The air curtain generation member may be arranged at a position where the air curtain generation member encloses a lower end of the first introduction unit.

The first introduction unit may include a first filter member to separate dust from the air flowing into the dust separation housing.

The second introduction unit may include a second filter member to separate dust from the air flowing into the air curtain generation member.

The first filter member may be configured to filter out finer dust than the second filter member.

Each of the first filter member and the second filter member may include a mesh.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
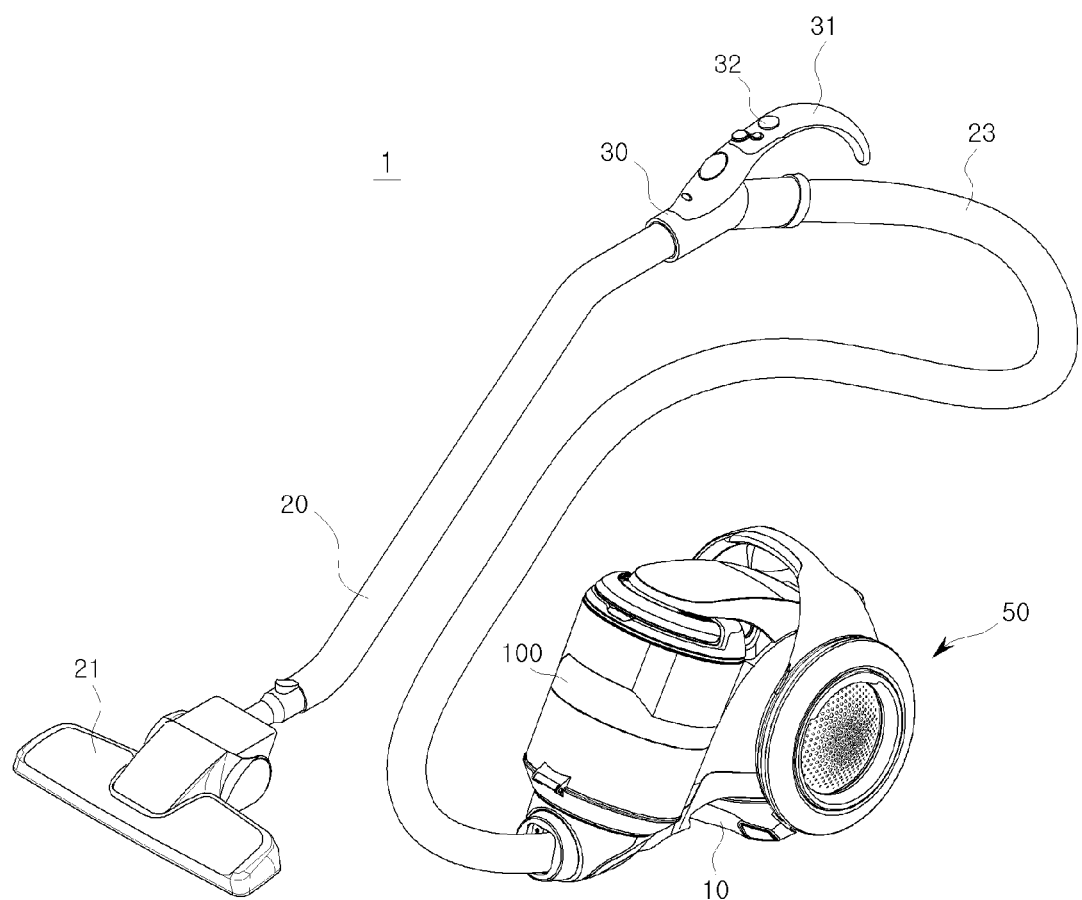
FIG. 1 is a view illustrating a cleaner according to an embodiment.

Reference will now be made in detail to the embodiments, examples of which are illustrated in the accompanying drawings, wherein like reference characters refer to like elements throughout.

The cleaner according to the embodiments will hereinafter be described with reference to the attached drawings. Terms "front end", "rear end", "upper part," "lower part," "upper end," and "lower end" are defined based on the drawings and do not limit shapes and positions of components.

Figure 2:
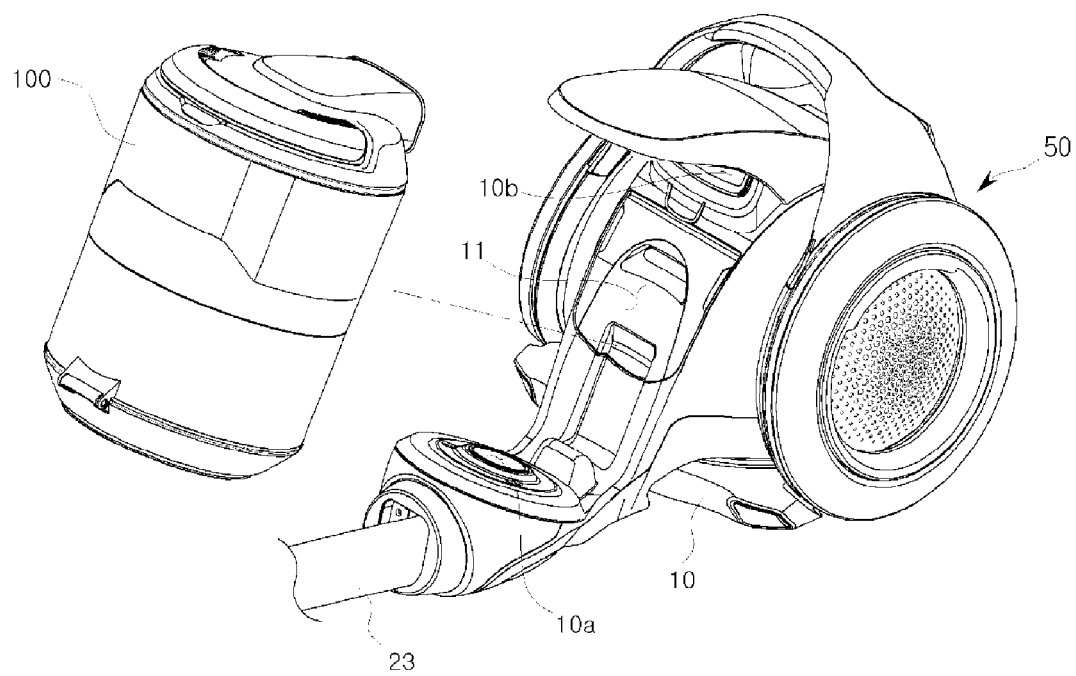
FIG. 2 is a view illustrating a cleaner in which a cyclone dust collection unit is separated from a main body according to an embodiment.

FIG. 1 is a view illustrating a cleaner according to an embodiment. FIG. 2 is a view illustrating a cleaner in which a cyclone dust collection unit is separated from a main body according to an embodiment.

The term "dust collection unit" 100 may be defined as including a cyclone dust collection unit. The term "dirt" may be defined as including dust and other foreign substances.

As illustrated in FIGS. 1 and 2, a cleaner 1 may include a main body 10, a dust collection unit 100, a suction part 21, and a wheel assembly 50. The dust collection unit 100 and the wheel assembly 50 may be mounted to the main body 10. The dust collection unit 100 may be detachably mounted to the main body 10. The suction part 21 may contact a surface to be cleaned, and thus suction foreign materials from the surface to be cleaned.

The main body 10 may include a fan motor (not illustrated) to generate suction force. The suction part 21 may suction air from a surface to be cleaned and suction dust from the suctioned air through the suction force generated by the main body 10. The suction part 21 may be formed to be wide and flat to closely contact the surface to be cleaned.

An extension pipe 20, a handle pipe 30, and a flexible hose 23 may be disposed between the main body 10 and the suction part 21. The extension pipe 20 may be formed of resin or metal, and may interconnect the suction part 21 and the handle pipe 30.

The handle pipe 30 may interconnect the extension pipe 20 and the flexible hose 23. The handle pipe 30 may include a handle unit 31 and a manipulation unit 32. The user may grasp the handle unit 31 to perform cleaning. The user may turn the cleaner 1 on or off by manipulating a button, or the like, mounted to the manipulation unit 32, or manipulate functions of the cleaner 1 such as adjustment of suction intensity.

The flexible hose 23 connects the handle pipe 30 to the main body 10. The flexible hose 23 may be formed of a flexible material to ensure free movement of the handle pipe 30.

The suction part 21, the extension pipe 20, the handle pipe 30 and the flexible hose 23 may communicate with each other. The air drawn into the suction part 21 may sequentially pass through the extension pipe 20, the handle pipe 30 and the flexible hose 23 and flow into the main body 10.

The main body 10 may be provided with a first body port 10a guiding the suctioned air to the dust collection unit 100 and a second body port 10b allowing the air purified in the dust collection unit 100 to be discharged therethrough. The second body port 10b may communicate with a suction chamber (not illustrated) provided with a fan motor (not illustrated).

The main body 10 may be provided with a mounting portion 11 to which the dust collection unit 100 is mountable. The dust collection unit 100 may be detachably mounted to the mounting portion 11. The dust collection unit 100 separates dust from the air suctioned through the suction part 21 and collects the separated dust such that purified air is directed to the fan motor (not illustrated) through the second body port 10b.

The dust collection unit 100 generates rotating airflow to separate dust from the air with centrifugal force. That is, the dust collection unit 100 generates a swirling airflow, and separates dust from the air using centrifugal force. When a certain amount of dust is accumulated in the dust collection unit 100, the user may detach the dust collection unit 100 and remove the dust therefrom.

Figure 3:
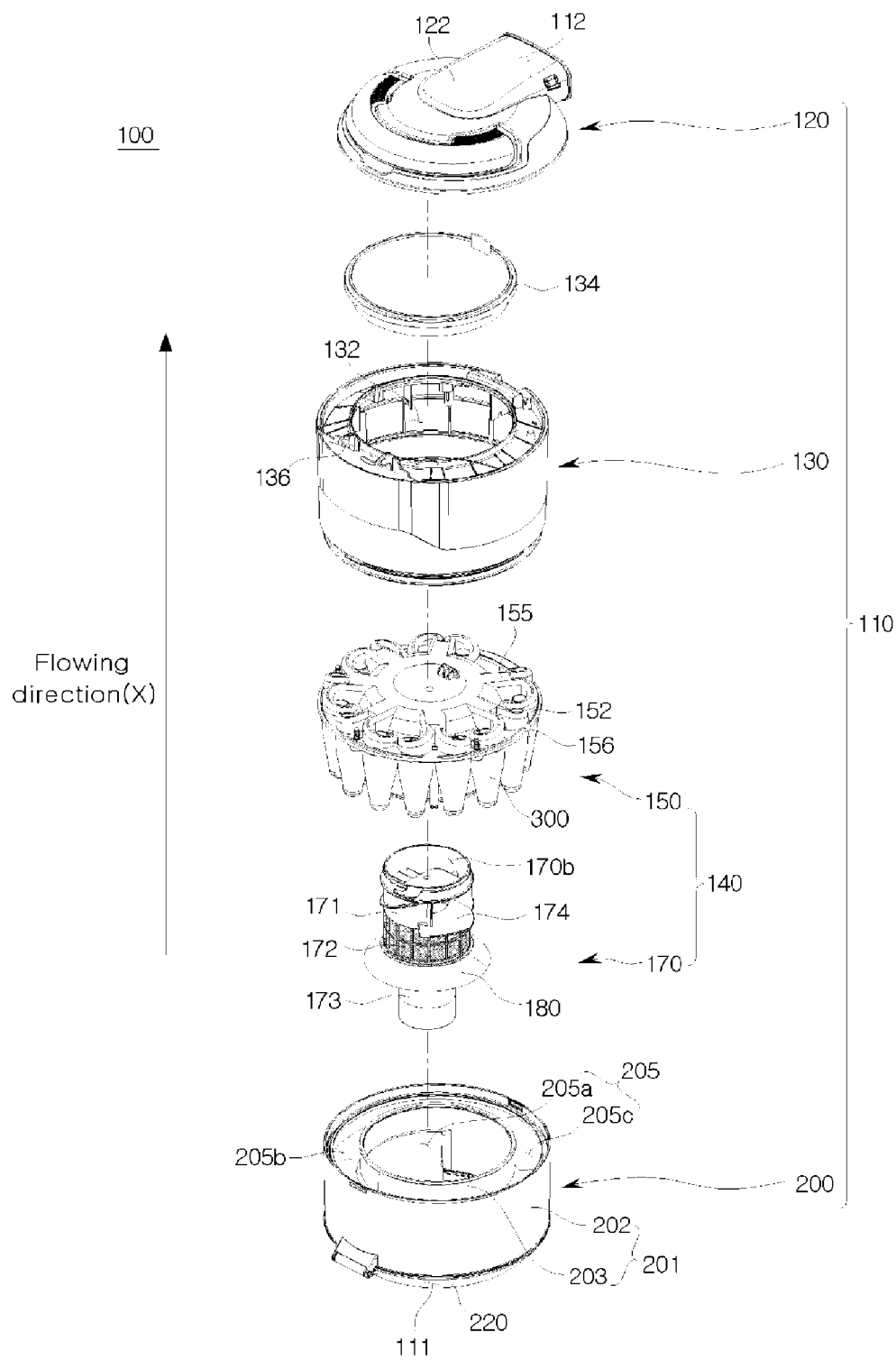
FIG. 3 is an exploded perspective view illustrating the cyclone dust collection unit of the cleaner according to an embodiment.
Figure 4:
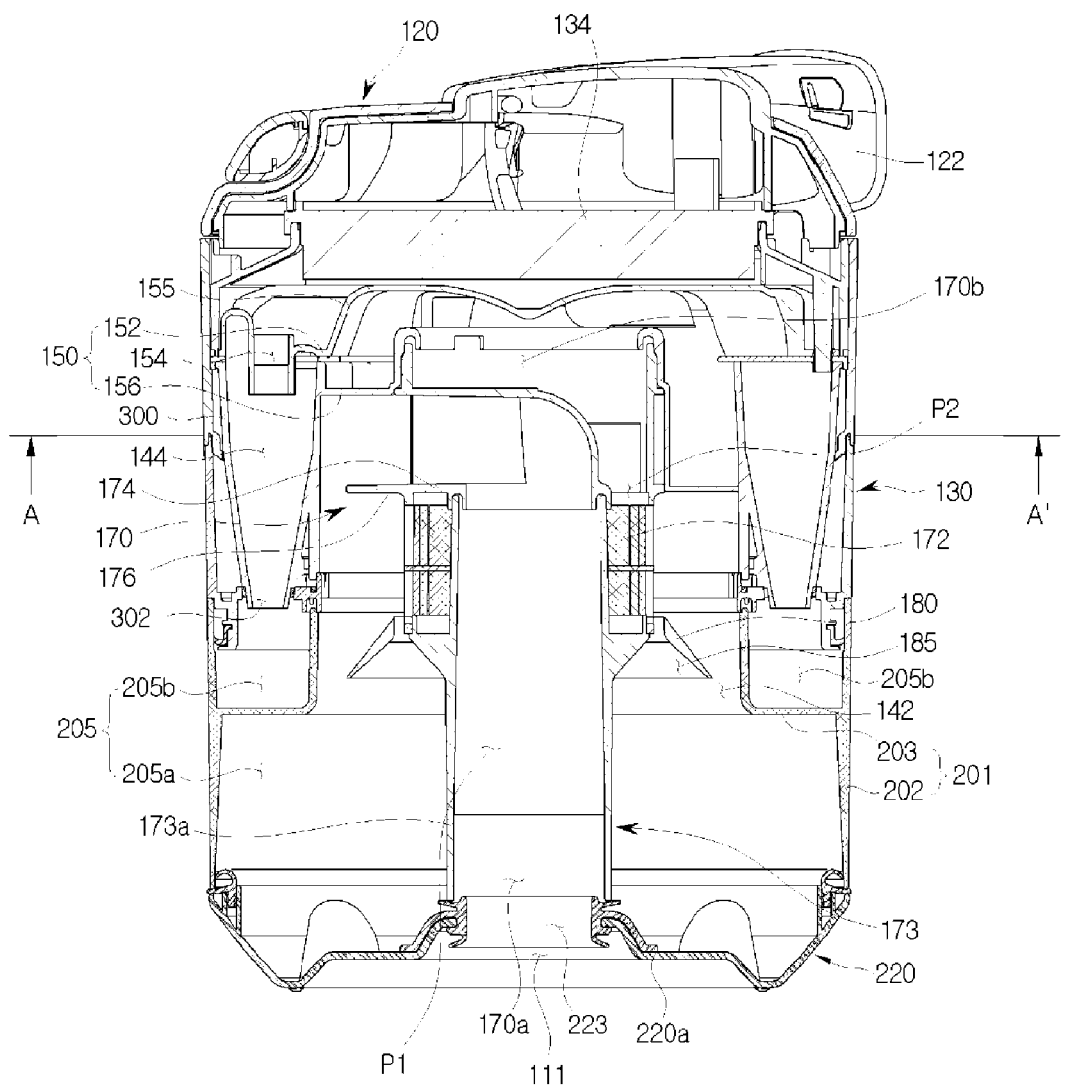
FIG. 4 is a cross-sectional view illustrating the cyclone dust collection unit of the cleaner according to an embodiment.
Figure 5:
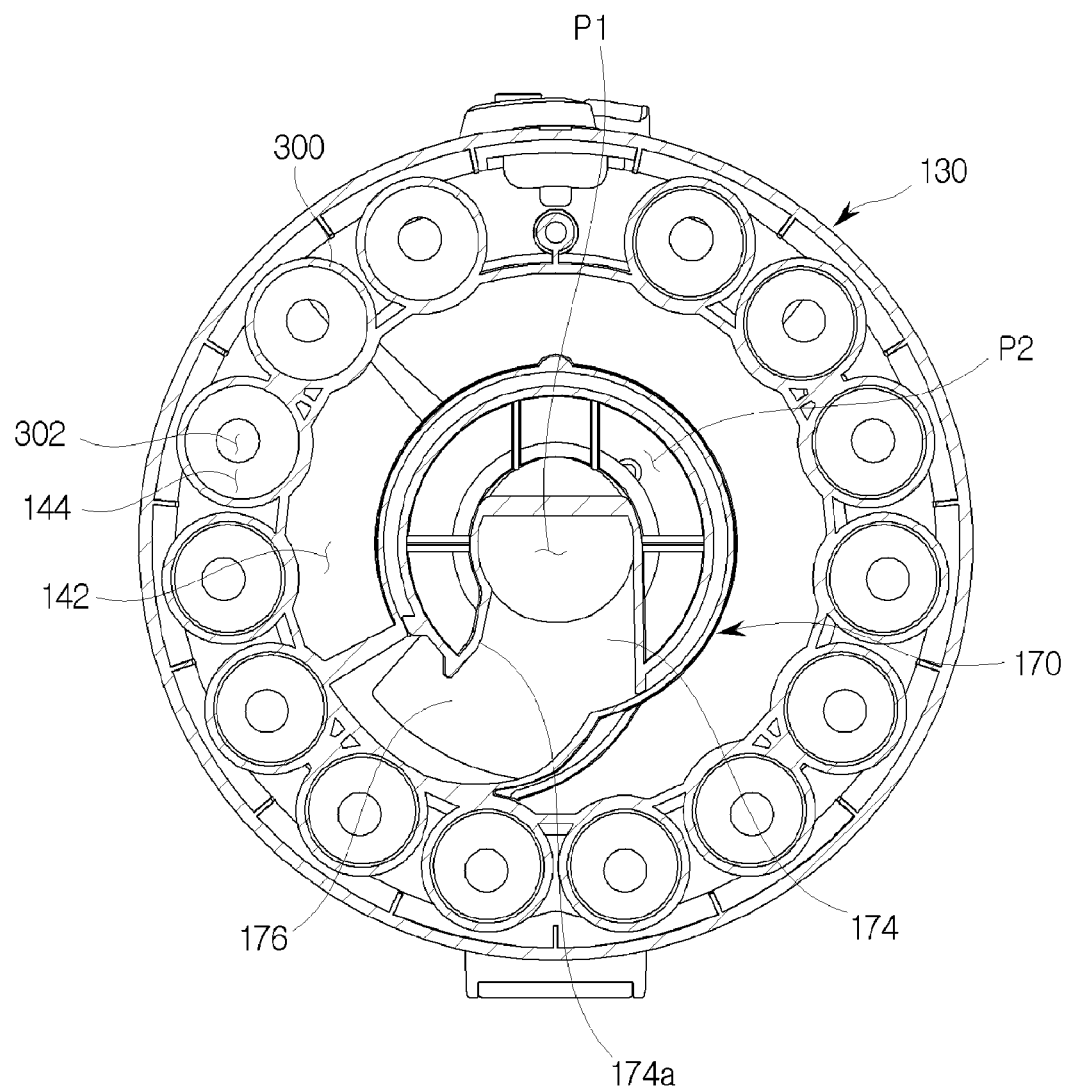
FIG. 5 is an exemplary cross-sectional view illustrating the cleaner taken along line A-A' of FIG. 4.

FIG. 3 is an exploded perspective view illustrating the cyclone dust collection unit of the cleaner according to an embodiment. FIG. 4 is a cross-sectional view illustrating the cyclone dust collection unit of the cleaner according to an embodiment of the present invention. FIG. 5 is an exemplary cross-sectional view illustrating the cleaner taken along line A-A' of FIG. 4.

Reference characters not shown in FIGS. 3-5 refer, for example, to FIGS. 1 and 2. At least one cyclone 300 may also be referred to as at least one dust separation unit or a corn. The term "upper cyclone body" 152 may also be referred to as a cover. The term "dust collection container" 200 may also be referred to as a dust reception unit.

As illustrated in FIGS. 3 to 5, the dust collection unit 100 may include a dust collection case 110 and a cyclone assembly 140.

The dust collection case 110 may be coupled to the main body 10 to collect dirt such as dust in the air. The dust collection case 110 coupled to the main body 10 may filter out dirt from the suctioned air and discharge purified air.

The dust collection case 110 may be provided with a suction port 220a and a discharge port 122. When the air suctioned through the suction part 21 flows into the dust collection case 110 through the suction port 220a, dust may be removed from the air in the dust collection case 110. The air may then be discharged from the body 10 through the discharge port 122. The air discharged from the dust collection case 110 through the discharge port 122 may flow into the suction chamber (not illustrated) through the second body port 10b.

The dust collection case 110 may include an inlet 111 through which air containing dust may be introduced and an outlet 112 through which purified air may be discharged. The dust collection unit 110 may include an inlet through which polluted air containing dust is introduced and an outlet 112 through which dust-free purified air may be discharged. The inlet 111 may be mounted to the suction port 220a, and the outlet 112 may be mounted to the discharge port 122.

The dust collection case 110 may form the external appearance of the dust collection unit 100. A portion of the dust collection case 110 may be formed of a transparent material such the inner space of the dust collection case 110 is visible. Although the dust collection case 110 may be formed approximately in a cylindrical shape, the scope or spirit is not limited thereto.

The dust collection case 110 may include an upper case 120, a middle case 130, and a dust collection container 200.

The middle case 130 may be formed in the shape of a cylinder having an open top and open bottom. An upper portion of the middle case 130 may be provided with a filter member 134 to re-filter out dirt from the air having passed through cyclone chambers 142 and 144. The filter member 134 may be provided to the upper portion of the middle case 130. That is, the filter member 134 may be disposed in an upper opening 132 of the middle case 130 so that fine dust remaining in the air having passed through the cyclone chambers 142 and 144 is filtered out through the filter member 134.

The upper case 120 may be arranged at an upper portion of the middle case 130. The upper case 120 may be pivotably hinged to a hinge 136 provided to the middle case 130. The upper case 120 may be provided with the discharge port 122 through which the air purified through the cyclone chambers 142 and 144 and the filter member 134 is discharged. The discharge port 122 may communicate with a suction chamber (not illustrated) in the main body in which a fan motor (not illustrated) is arranged.

The dust collection container 200 may collect dust separated from the air, and may communicate with at least one cyclone 300. The dust collection container 200 may be provided below the middle case 130 so as to collect dust contained in the air.

The dust collection container 200 may include a container body 201 and a dust collection chamber 205 provided in the container body 201 to collect dust or dirt therein.

The dust collection chamber 205 may include a first dust collection chamber 205a and a second dust collection chamber 205b. The first dust collection chamber 205a may correspond to the first cyclone dust collection chamber 142, and the second dust collection chamber 205b may correspond to the second cyclone dust collection chamber 144. That is, dust discharged from the first cyclone chamber 142 may be collected in the first dust collection chamber 205a, and dust discharged from the second cyclone chamber 144 may be collected in the second dust collection chamber 205b. The second cyclone chamber 144 may be arranged in a circumferential direction along a circumference of the first cyclone chamber 142, so that the second dust collection chamber 205b may be arranged in a circumferential direction with respect to the first dust collection chamber 205a so as to correspond to the second cyclone chamber 144. That is, the second dust collection chamber 205b may be formed in a ring shape, and at least some parts of the second dust collection chamber 205b may be formed along a circumference of an upper portion of the first dust collection chamber 205a.

The second dust collection chamber 205b may include a discharge chamber 205c. The discharge chamber 205c may be formed to collect dust or dirt collected in the second dust collection unit 205b. The discharge chamber 205c may be provided in a deep-depth section of the second dust collection chamber 205b. An end of the discharge chamber 205c may be opened or closed by the discharge cover 220.

The container body 201 may include a container outer wall 202 and a container inner wall 203. The container outer wall 202 may be formed in the shape of a cylinder having an open top and open bottom, and the container inner wall 203 may be formed in the shape of a flange extending inward to have an annular space at the inner upper portion of the container outer wall 202. The first dust collection chamber 205a may be enclosed by the inner side of the container outer wall 202, the inner side of the container inner wall 203, and the discharge cover 220. The second dust collection chamber 205b may be enclosed by the inner side of the container outer wall 202, the outer side of the container inner wall 203, and the discharge cover 220.

At least one portion of the dust collection container 200 may be formed of a transparent material such that the dust collection chamber 205 may be visible from the outside of the dust collection container 200.

The discharge cover 220 may be provided with the suction port 220a. The suction port 220a allows the air introduced through the flexible hose 23 to flow into the dust collection unit 100. The suction port 220a may communicate with an introduction pipe 173. The suction port 220a may be disposed at the discharge cover 220 such that the air suctioned through the suction part 21 flows into a lower portion of the dust collection case 110, not introduced by going around a lateral surface of the dust collection case 110. The inlet 111 may be provided at the suction port 220a. Although the inlet 111 may be disposed at the center of the suction port 220a, the scope or spirit is not limited thereto.

The cyclone assembly 140 may be provided in the dust collection case 110.

The cyclone unit 140 generates swirling airflow such that dirt may be separated from the air by centrifugal force. Swirling airflow may be generated when the fan motor (not illustrated) provided in the main body 10 is driven.

The cyclone chambers 142 and 144, in which the swirling airflow may be created by the suction force generated by the fan motor may be provided in the dust collection case 110. The air and dust may be centrifugally separated from each other in the cyclone chambers 142 and 144 to filter out the dust. The cyclone chambers 142 and 144 may include a first cyclone chamber 142 and a second cyclone chamber 144.

The first cyclone chamber 142 may be defined by a dust separation unit (e.g., a grille) 170, a cyclone body 150, and the dust collection case 110. The second cyclone chamber 144 may be defined by the cyclone body 150 and at least one cyclone 300.

An exemplary arrangement relationship of the dust collection unit 100 is described. The arrangement relationship of the dust collection unit 100 will hereinafter be described with reference to exemplary airflow. When the direction in which the air introduced through the inlet 111 moves toward the outlet 112 is defined as a flowing direction "X", the upper case 120 may be located downstream of the flowing direction X, and the dust collection container 200 may be located upstream of the flowing direction X. The cyclone assembly 140 may be disposed between the upper case 120 and the dust collection container 200. The filter member 134 may be arranged downstream of the cyclone assembly 140 in the flowing direction X so that remaining dust can be removed from the air having passed through the cyclone assembly 140. The filter member 134 may be arranged downstream of the upper cyclone body 152 in the flowing direction X in such a manner that the air having passed through a discharge port 154 can be delivered therethrough.

Figure 6:
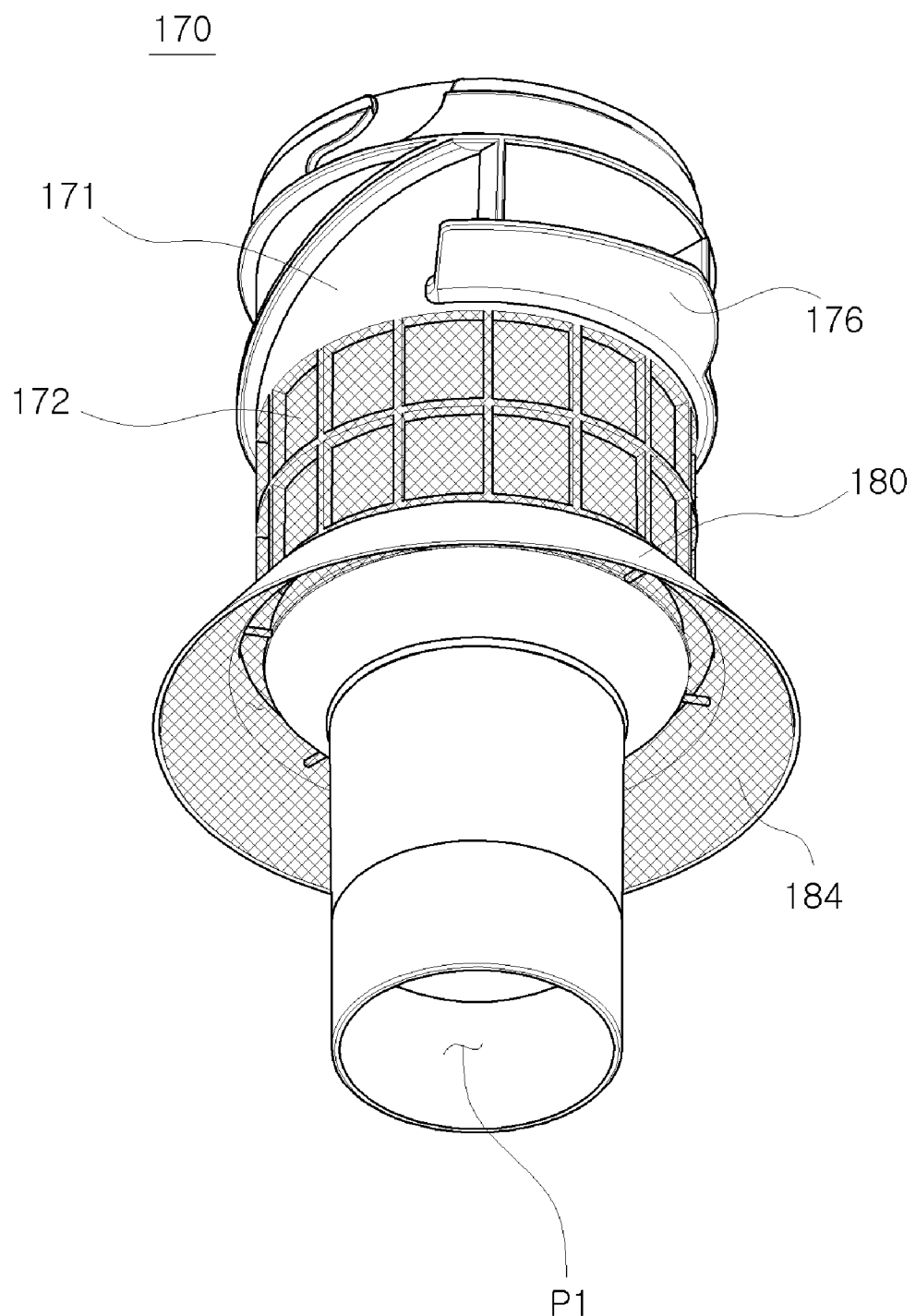
FIG. 6 is a perspective view illustrating a dust separation unit of a cleaner according to an embodiment.
Figure 7:
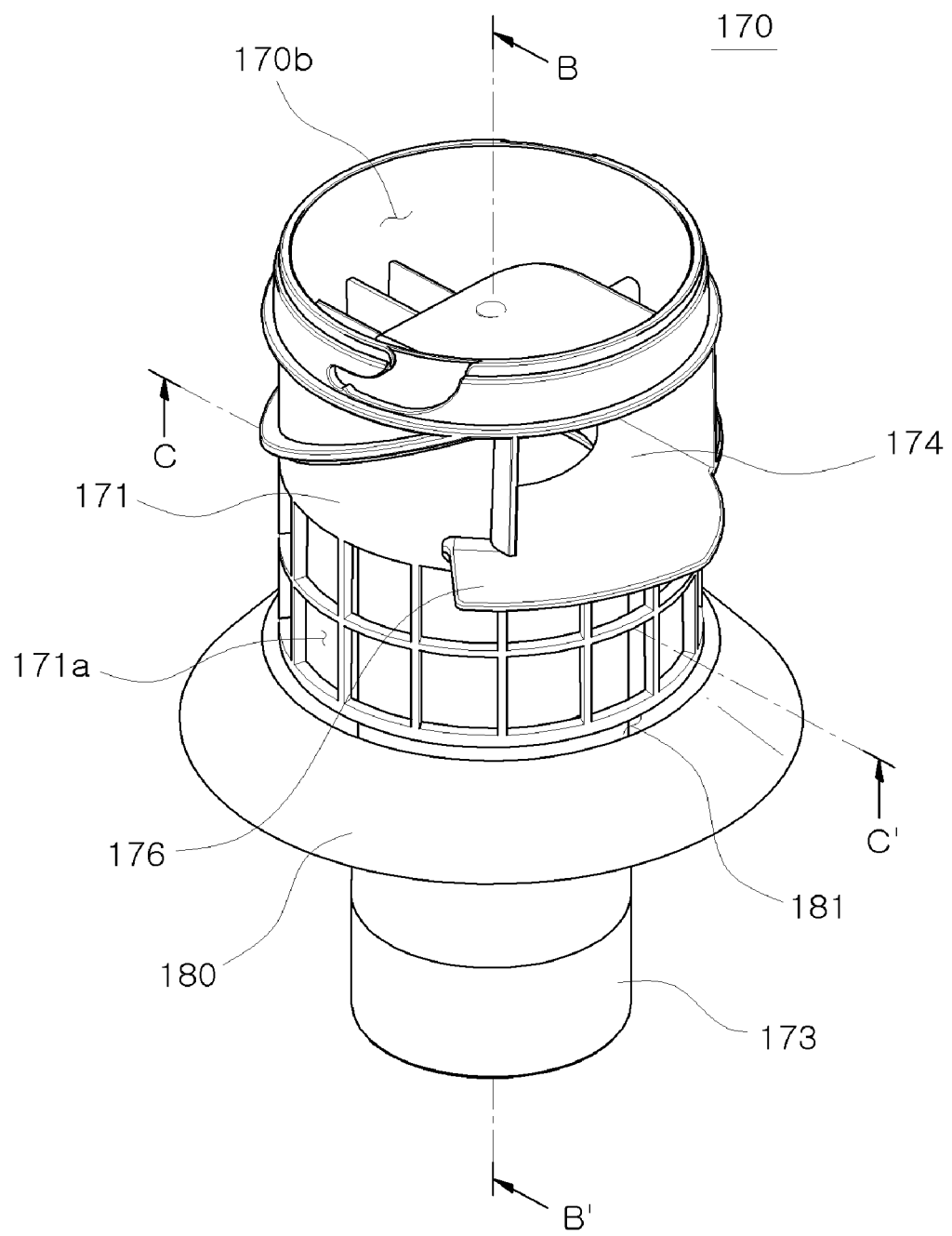
FIG. 7 is an exemplary perspective view illustrating a state in which a filter member is not included in the dust separation unit of FIG. 6.
Figure 8:
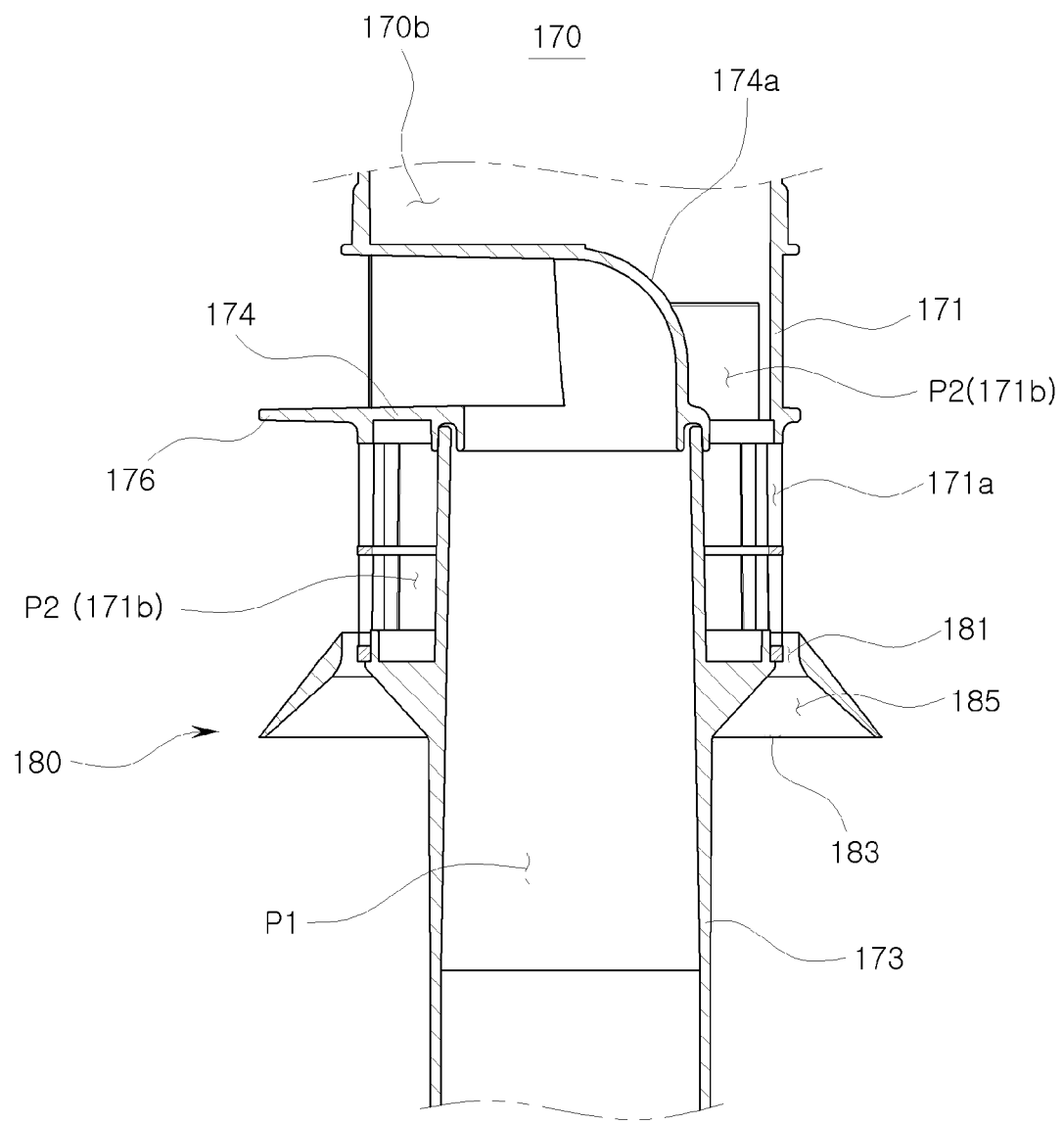
FIG. 8 is an exemplary cross-sectional view illustrating the dust separation unit taken along the line B-B' of FIG. 7.
Figure 9:
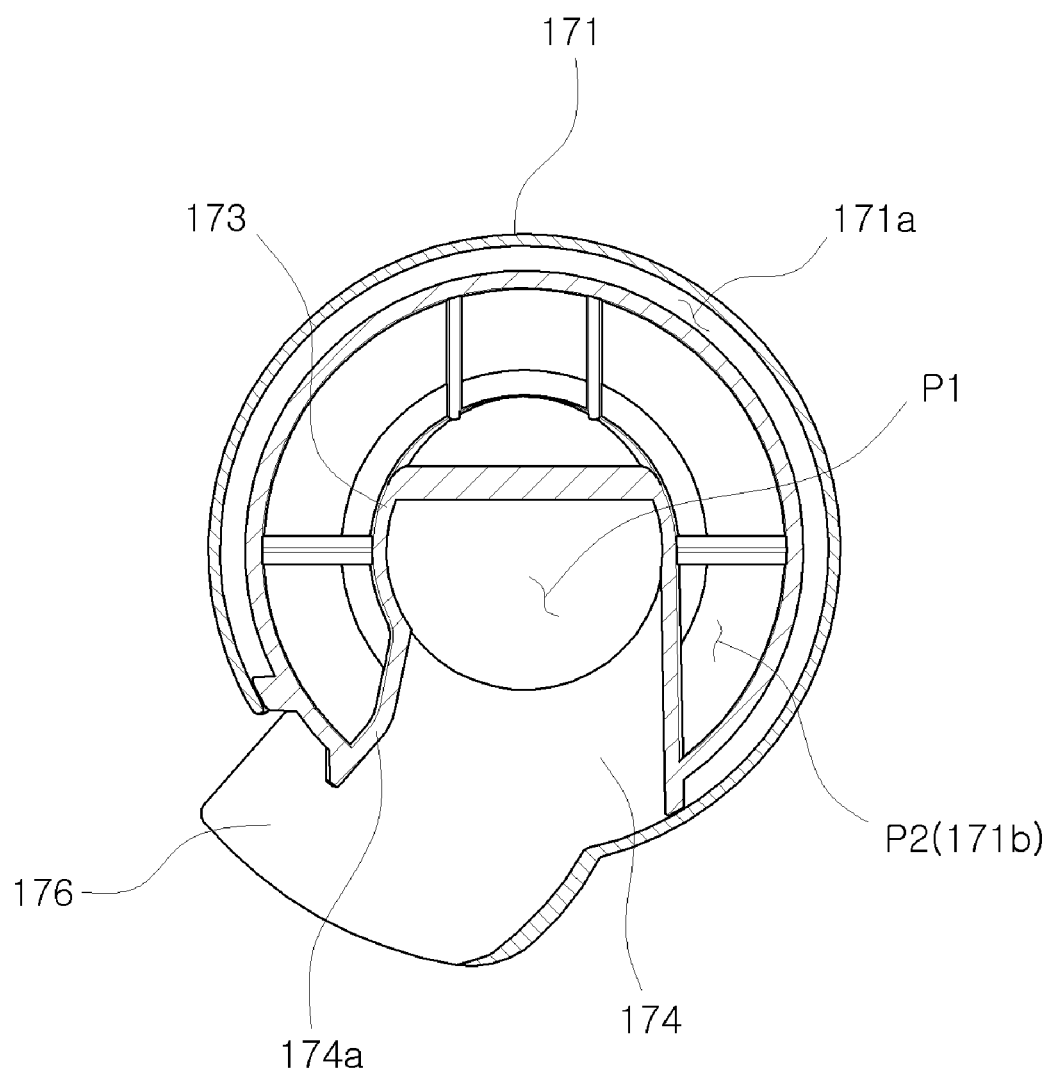
FIG. 9 is an exemplary cross-sectional view illustrating the dust separation unit taken along the line C-C' of FIG. 7.

FIG. 6 is a perspective view illustrating a dust separation unit of the cleaner according to an embodiment. FIG. 7 is an exemplary perspective view illustrating a state in which the filter member is omitted from the dust separation unit of FIG. 6. FIG. 8 is an exemplary cross-sectional view illustrating the dust separation unit taken along line B-B' of FIG. 7. FIG. 9 is an exemplary cross-sectional view illustrating the dust separation unit taken along line C-C' of FIG. 7. Reference characters not shown in FIGS. 6-9 refer, for example, to FIGS. 1 to 5.

As illustrated in FIGS. 3 to 9, the cyclone assembly 140 may include a dust separation unit 170 and a cyclone body 150.

As illustrated in FIGS. 3, 4, 10 and 11, the cyclone body 150 may be arranged in the dust collection case 110. The cyclone body 150 may be provided with the dust separation unit 150 seated therein. The cyclone body 150 may guide the air discharged from the first cyclone chamber 142 such that the air moves to the second cyclone chamber 144 via the dust separation unit 170.

The cyclone body 150 includes an upper cyclone body 152 and a lower cyclone body 156. The dust separation unit 170 and at least one cyclone 300 having the second cyclone chamber 144 may be seated in the lower cyclone body 156. A guide pipe 155 may be formed in the upper cyclone body 152 to guide the air discharged from the first cyclone chamber 142 such that the air having passed through a dust separation housing 171 from the first cyclone chamber 142 flows into the second cyclone chamber 144. The upper cyclone body 152 may be coupled to at least one cyclone 300 in such a manner that air introduced through the inlet 111 may be directed to at least one cyclone 300. An exemplary upper cyclone body 152 is described in detail.

The lower cyclone body 156 may be provided with a unit seating portion 160 allowing one end of the dust separation unit 170 to be seated thereon. The unit seating portion 160 may be provided with a coupling protrusion (not illustrated) to fix the dust separation unit 170, and a coupling groove 162 corresponding to the coupling protrusion (not illustrated) may be formed in the dust separation unit 170.

Referring, for example, to FIGS. 6 to 9, the dust separation unit 170 may be seated in the dust collection case 110 to filter out dust particles greater than a certain size contained in the air discharged from the first cyclone chamber 142.

The dust separation unit 170 may include a dust separation housing 171 and an introduction pipe 173.

The introduction pipe 173 may guide the air introduced from the inlet 111 of the suction port 220a to the first cyclone chamber 142. Accordingly, the introduction pipe 173 may be arranged such that one end thereof communicates with the inlet 111 of the suction port 220a, and the other end thereof communicates with the first cyclone chamber 142.

The introduction pipe 173 may include an introduction pipe body 173a, an introduction hole 170a provided to one end of the introduction pipe body 173a to communicate with the inlet 111, and a guide unit 174 provided to the other end of the introduction pipe body 173a to guide the air to the first cyclone chamber 142. The guide unit 174 may extend from the introduction pipe body 173a such that it may be bent in a radial direction with respect to the longitudinal direction of the introduction pipe body 173a.

The guide unit 174 may include a discharge guide surface 174a formed in shape of a curved surface to allow the air guided through a first flow passage P1 in the introduction pipe body 173a to be spirally discharged with respect to the direction in which the first flow passage P1 extends. When the air discharged through the guide unit 174 is diverted in a circumferential direction by a first airflow guide surface 167, the discharge guide surface 174a allows natural directional diversion by causing the air to be discharged along a spiral path.

Thus, the air introduced through the suction unit 21 may flow into the introduction pipe 173 through the inlet 111 and the introduction hole 170a, and may be discharged to the first cyclone chamber 142 through the guide unit 174. A first flow passage P1 may be formed in the introduction pipe 173, and the first flow passage P1 may be provided in a manner that the air introduced into the first cyclone chamber 142 passes through the first flow passage P1.

The dust separation housing 171 may be provided in the dust collection case 110. The dust separation housing 171 may partition the first cyclone chamber 142 from a discharge outlet 170b or a discharge port 122, such that dust separated by the swirling airflow generated by the first cyclone chamber 142 is not discharged through the discharge outlet 170b or the discharge port 122 via the first cyclone chamber 142.

The dust separation housing 171 may include an inner space 171b, and a first introduction unit 171a may be provided at a side of the dust separation housing 171. The first introduction unit 171a may be located opposite to the first cyclone chamber 142 at a side of the dust separation housing 171. The first introduction unit 171a may be formed in shape of a ring enclosing a lateral surface of the dust separation housing 171.

The first introduction unit 171a may be used as a passage through which the air of the first cyclone chamber 142 moves into the inner space 171b of the dust separation housing 171. The first introduction unit 171a may be used as a passage through which the air from which dust may be separated through the swirling airflow in the first cyclone chamber 142 moves into the inner space 161b of the dust separation housing 171.

The first introduction unit 171a may include a first filter member 172 therein. The first filter member 172 may separate dust from the air flowing into the inner space 171b of the dust separation housing 171 in the first cyclone chamber 142. The first filter member 172 may include a mesh. The first filter member 172 may separate fine dust remaining in the air from which dust may be separated by centrifugal force along the swirling airflow in the first cyclone chamber 142.

A discharge outlet 170b communicating with the discharge port 122 may be formed at one side of the dust separation housing 171. The air transferred from the first cyclone chamber 152 to the inner space 171b of the dust separation housing 171 may be discharged to the outside of the dust separation unit 170 through the discharge outlet 170b provided at one end of the dust separation housing 171. The air discharged through the discharge outlet 170b may flow into the second cyclone chamber 144 through the guide pipe 155.

An introduction pipe 173 may be provided in the inner space 171b of the dust separation housing 171. The dust separation housing 171 may be detachably coupled to the introduction pipe 173. Although the dust separation housing 171 and the introduction pipe 173 according to the embodiment can be detachably coupled to each other, the dust separation housing 171 and the introduction pipe 173 may be integrated into one body without departing from the scope or spirit. The dust separation housing 171 may be formed to enclose the introduction pipe 173.

The dust separation housing 171 may be spaced apart from the introduction pipe 173 by a predetermined distance. A second flow passage P2 may be formed between the dust separation housing 171 and an outer surface of the introduction pipe 173. The second flow passage P2 may be provided in the inner space 171b of the dust separation housing 171. The dust separation housing 171 may be spaced a certain distance from the outer surface of the introduction pipe 173, so that a second flow passage P2 may be formed between the dust separation housing 171 and the outer surface of the introduction pipe 173.

The first flow passage P1 and the second flow passage P2 may be both formed, e.g., simultaneously formed in the dust separation unit 170. The first flow passage P1 may be formed in the introduction pipe 173 so that the first flow passage P1 directs the air received from the introduction hole 170a. The second flow passage P2 may be formed between the introduction pipe 173 and the dust separation housing 171 so that the second flow passage P2 directs the air transferred from the first cyclone chamber 142 to the dust separation housing 171 toward the discharge outlet 170b. The first flow passage P1 and the second flow passage P2 may be formed in the same direction. The introduction pipe body 173a and the dust separation housing 171 may be arranged to have a same centerline with respect to a longitudinal direction.

Since the first flow passage P1 and the second flow passage P2 may be both arranged, e.g., simultaneously arranged in the dust separation unit 170, the cyclone assembly 140 can be simplified in structure. Since the first flow passage P1 and the second flow passage P2 may be arranged in the dust separation unit 170 along the same direction, it may not be necessary to construct the air pipe directing the introduced air so as to transfer the air from the suction unit 21 to the cyclone chambers 142 and 144, and the air received from the suction unit 21 can immediately flow into the cyclone chambers (142, 144), resulting in reduction of flow-passage resistance.

For example, the dust separation unit 170 may include an air curtain generation member 180. The air curtain generation member 180 may generate the ascending airflow that rises along an outer lateral surface of the dust separation housing 171. The air curtain generation member 180 may prevent the swirling airflow of the first cyclone chamber 142 from being applied to the first introduction unit 171a, before the dust may be removed from the swirling airflow of the first cyclone chamber 142 using the ascending airflow.

The air curtain generation member 180 may be coupled to a lower portion of the dust separation housing 171. The air curtain generation member 180 may be formed to enclose one side of a lower portion of the dust separation housing 171. The air curtain generation member 180 may be formed to have a larger width with decreasing distance to the bottom part. The air curtain generation member may be formed in a conical shape.

An air compression unit 185 may be formed in the air curtain generation member 180. The air compression unit 185 may be provided in the inner space disposed between the introduction pipe 173 and the inner lateral surface of the air curtain generation member 180. The air compression unit 185 may be formed to have a smaller width with decreasing distance to the top part.

The air curtain discharge unit 181 may be provided at an end of the upper part of the air curtain generation member 180. The air curtain discharge unit 181 may be provided outside of a lower end of the first introduction unit 171a. The air curtain discharge unit 181 may be formed to enclose an external side of a lower end of the first introduction unit 171a.

The air curtain discharge unit 181 may be formed in a hole shape through which the air compression unit 185 may communicate with the first cyclone chamber 142. The air curtain discharge unit 181 may be formed upward to discharge the ascending airflow that rises along the outer lateral surface of the dust separation housing 171.

The second introduction unit 183 may be formed at a side of a lower part of the air curtain generation member 180. The second introduction unit 183 may be formed to enclose an end of a lower part of the introduction pipe 173. The second introduction unit 183 may be used as an air passage through which the air flows into the air compression unit 185 contained in the air curtain generation member 180.

For example, the second introduction unit 183 may be formed to have a larger cross-section than the air curtain discharge unit 181. As a result, the air curtain generation member 180 may be configured in a manner that the amount of air introduced into the air compression unit 185 during a predetermined time may be larger than the amount of air discharged to the outside of the air compression unit 185 during the predetermined time. Therefore, if the air introduced into the first dust collection unit 205*a* along the swirling airflow is applied, e.g., persistently applied to the second introduction unit 183, the air curtain generation member 180 may allow the air curtain discharge unit 181 to discharge the ascending airflow due to the increased pressure of the air compression unit 185.

A second filter member 184 may be provided in the second introduction unit 183. The second filter member 184 may separate the dust from the air being transferred from the first dust collection chamber 205*a* to the air compression unit 185 of the air curtain generation member 180. The second filter member 184 may include a mesh. The second filter member 184 may separate fine dust remaining in the air from which dust is separated by centrifugal force along the swirling airflow in the first cyclone chamber 142.

For example, the first filter member 172 may be configured to separate fine dust as compared to the second filter member 184. The spacing of a mesh of the first filter member 172 may be smaller than the spacing of a mesh of the second filter member 184.

The dust collection unit 100 may repeatedly separate the dust from the air moved to the inner space thereof. The dust collection unit 100 can separate the dust from the air moved to the inner space through the swirling airflow in the first cyclone chamber 142. The air purified in the first cyclone chamber 142 may move to the air compression unit 185 provided in the inside of the air curtain generation member 180 in the first dust collection chamber 205*a*. The air passes through the second filter member 184 provided in the second introduction unit 183, so that the dust can be separated from the air. The air of the inner space of the air compression unit 185 forms the ascending airflow rising along the outer circumference of the first introduction unit 171*a* in the air curtain discharge unit 181, and may be then discharged to the first cyclone chamber 142. The air discharged from the air curtain discharge unit 181 may move to the second flow passage P2 through the first introduction unit 171*a*. The dust can be separated from the first filter member 172 provided in the first introduction unit 171*a*. The dust may be separated from the air several times, resulting in increased dust separation efficiency.

The ascending airflow discharged from the air curtain discharge unit 181 to the first cyclone chamber 142 may form an air curtain that prevents the swirling airflow of the first cyclone chamber 142 from being applied to the first introduction unit 171*a*. If the air having the dust is mixed with the air introduced into the second flow passage P2, the mesh serving as the first filter member 172 may be clogged with dust or dirt, so that the cleaner may malfunction. However, according to an embodiment, the air curtain generated by the air curtain generation member 180 may prevent the air introduced into the second flow passage P2 from being mixed with raw air having dust. As a result, dust separation efficiency of the dust separation unit 100 can be increased, and the filter contained in the dust collection unit 100 can be easily replaced and malfunction of the cleaner can be prevented.

Figure 10:
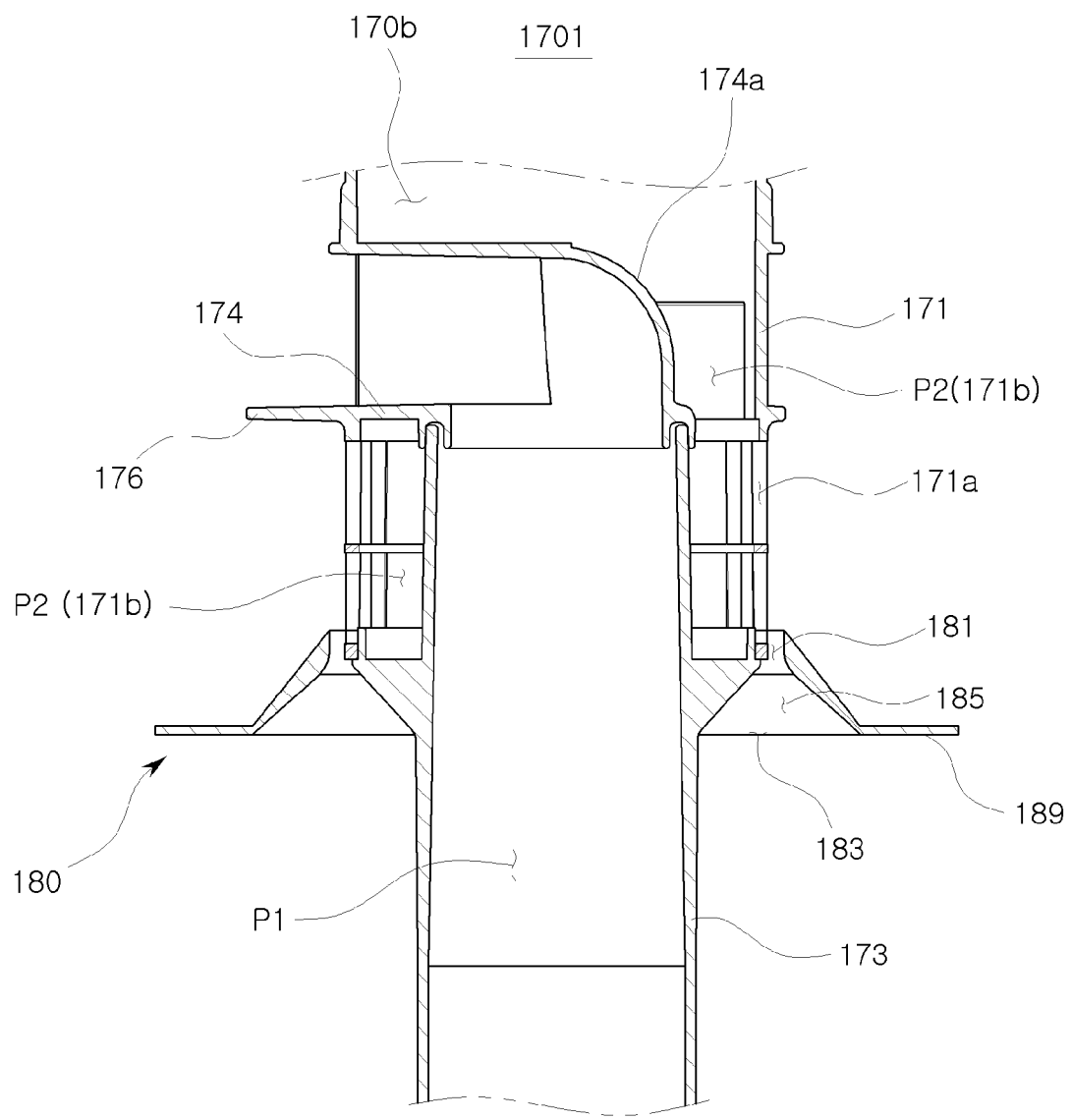
FIG. 10 is an exemplary cross-sectional view illustrating a modification example of an air curtain generation member illustrated in FIG. 6.

FIG. 10 is a cross-sectional view illustrating an exemplary modification example of the air curtain generation member illustrated in FIG. 6.

Referring to FIG. 10, a dust separation unit 1701 may include an air curtain generation member 180 that may include an air curtain discharge unit 1811, a second introduction unit 183, a second filter member 184, an air compression unit 185, and an air guide unit 189.

The air curtain generation member 180 may further include the air guide unit 189 as compared to the air curtain generation member of FIG. 8, and other elements as disclosed herein. The air guide unit 189 will hereinafter be described.

The air guide unit 189 may be formed below the air compression unit 185. The air guide unit 189 may be formed in a radial shape extending outward from the bottom of the air compression unit 185. The air guide unit 189 may be formed at a same height as in the second introduction unit 183. As a result, the air guide unit 189 may allow the ascending air in the first dust collection chamber 205*a* to easily flow into the second introduction unit 183. The ascending air in the first dust collection chamber 205*a* may directly flow into the second introduction unit 193, or may move to the second introduction unit 183 along the air guide unit 189.

Figure 11:
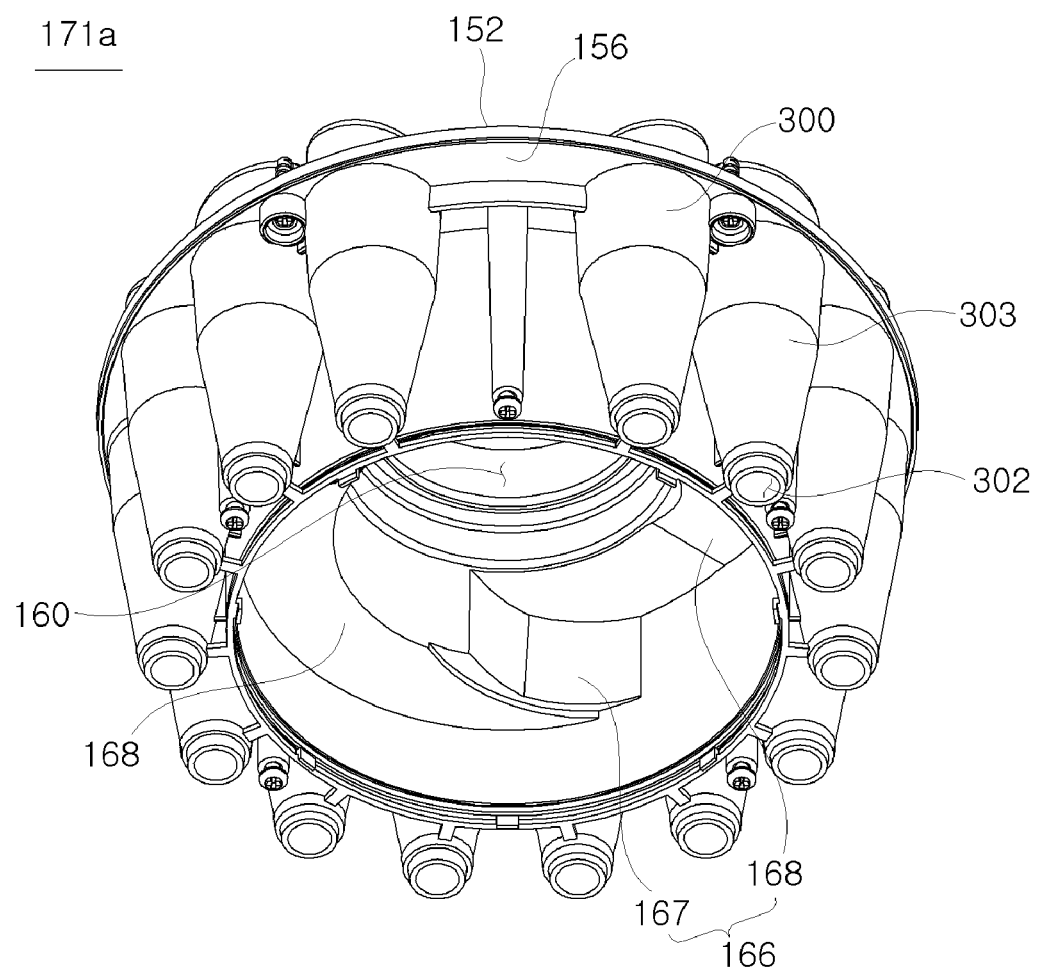
FIG. 11 is a perspective view illustrating a cyclone body of a cleaner according to an embodiment.
Figure 12:
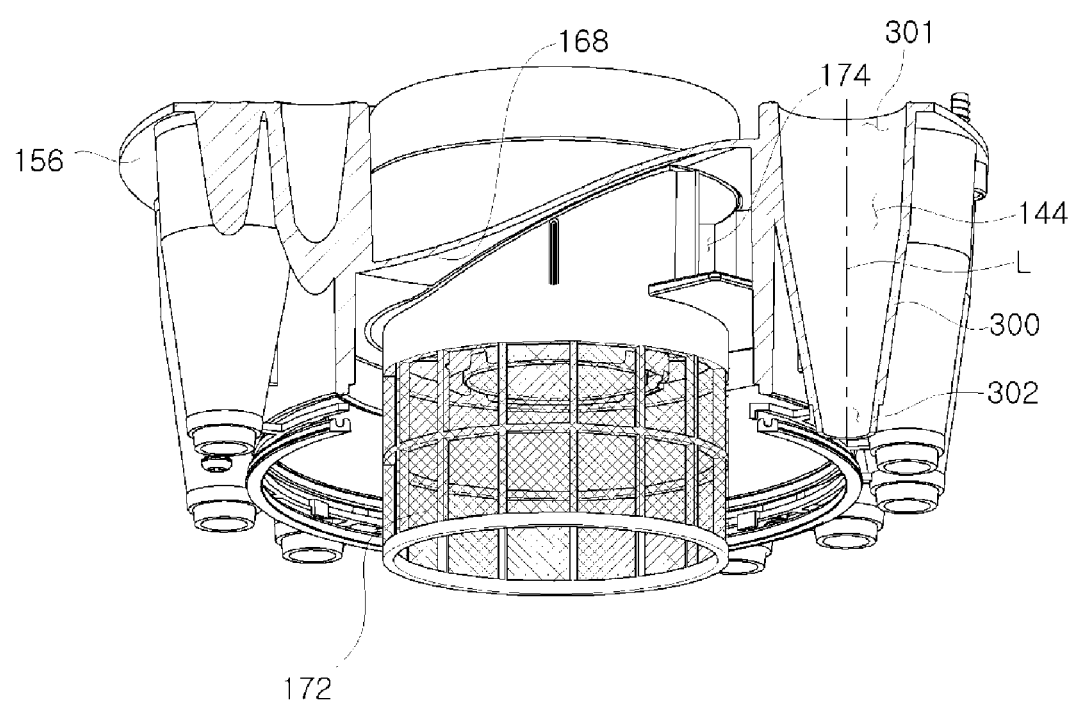
FIG. 12 is a perspective view illustrating a coupling state in which the dust separation unit of the cleaner is combined with a cyclone body according to an embodiment.

FIG. 11 is a perspective view illustrating a cyclone body of a cleaner according to an embodiment. FIG. 12 is a perspective view illustrating a coupling state in which the dust separation unit of the cleaner is combined with a cyclone body according to an embodiment. Reference characters not shown in FIGS. 11-12 refer, for example, to FIGS. 1 to 10.

Referring to FIGS. 3 to 9 and FIGS. 11 and 12, the cyclone assembly 140 may include the airflow formation unit 166. The airflow formation unit 166 may be formed to achieve swirling movement of the air directed from the introduction pipe 173 to the first cyclone chamber 142.

The airflow formation unit 166 may form the swirling airflow in the air introduced into the first cyclone chamber 142. The airflow formation unit 166 may be provided in the cyclone body 150. The airflow formation unit 166 may be configured to form the swirling airflow when the air passing through the first flow passage P1 is discharged to the guide unit 174 and flows into the first cyclone chamber 142. Although the airflow formation unit 166 of the embodiment may be formed in the cyclone body 150, the arrangement and shapes of the airflow formation unit 166 can be modified in various ways.

The airflow formation unit 166 may be formed along a circumference of the dust separation unit 170. That is, the airflow formation unit 166 may be arranged in the cyclone body 150 along the circumference of the dust separation unit 170.

The airflow formation unit 166 may include a first airflow guide surface 167 and a second airflow guide surface 168.

At least some parts of the first airflow guide surface 167 may be concaved and formed to contact the air discharged from the introduction pipe 173 so that the air introduced into the first cyclone chamber 142 rotates (or swirls) around the circumferential direction on the basis of the dust separation unit 170. That is, the first airflow guide surface 167 may be concaved in a manner that the proceeding direction of the air discharged to the guide unit 174 can be bent in the circumferential direction. The first airflow guide surface 167 may be curved in a manner that the air discharged from the guide unit 174 can be naturally diverted. The first airflow guide surface 167 may be modified in various shapes.

The second airflow guide surface 168 may be a guide surface tilted toward the first cyclone chamber 142 in the circumferential direction on the basis of the dust separation unit 170. The dust separation unit 170 may be arranged below the cyclone body 150, so that the second airflow guide surface 168 may protrude downward from the cyclone body 150 in the circumferential direction on the basis of the dust separation unit 170. Thus, the air rotating or swirling in the circumferential direction by the first airflow guide surface 167 may move toward the first cyclone chamber 142.

The guide unit 174 provided at one end of the introduction unit 173 may be located adjacent to the first introduction unit 171a of the dust separation housing 171, so that the air discharged from the guide unit 174 may directly flow into the first introduction unit 171a. The dust separation unit 170 may further include the airflow formation rib 176.

The airflow formation rib 176 may be provided toward the first cyclone chamber 142 in a manner that the airflow formation rib 176 may be located close to the guide unit 174. By formation of the airflow formation rib 176, the air discharged from the guide unit 174 may be separated from the dust separation housing 171, so that the discharged air may flow into the first cyclone chamber 142.

Referring, for example, to FIGS. 11 and 12, the cyclone assembly 140 may further include the second cyclone chamber 144.

The second cyclone chamber 144 may be arranged in a radial direction of the first cyclone chamber 142. The second cyclone chamber 144 may be provided in at least one cyclone 300. The second cyclone chamber 144 may secondarily separate the primarily purified air received from the first cyclone chamber 142 using centrifugal force. The air introduced from the first cyclone chamber 142 to the dust separation unit 170 may move to at least one cyclone 300 through the guide pipe 155 of the cyclone body 150, and may be secondarily separated from the dust through centrifugal processing in the second cyclone chamber 144 provided in at least one cyclone 300.

At least one cyclone 300 may be arranged to separate the dust from the air introduced through the inlet 111.

At least one cyclone 300 may be arranged in the dust collection case 110.

At least one cyclone 300 may be provided in the dust collection case 110 to separate the dust from the air introduced through the inlet 111. At least one cyclone 300 may be arranged along the circumference of the lower cyclone body 156.

A second cyclone chamber 144 may be formed in at least one cyclone 300. The dust can be centrifugally separated from the air in the second cyclone chamber 144.

At least one cyclone 300 may include an air inlet 301 and a dust outlet 302. The air inlet 301 may be formed in a manner that the air introduced through the inlet 111 flows into at least one cyclone 300. The dust outlet 302 may be opened toward the dust collection container 200. Alternatively, the dust outlet 302 may communicate with the dust collection container 200. The air inlet 301 may be located at an upper part of at least one cyclone 300 in a longitudinal direction L. The dust outlet 302 may be located at a lower part of at least one cyclone 300 in a longitudinal direction L. That is, the dust outlet 302 along with the air inlet 301 may be arranged along the longitudinal direction L of at least one cyclone 300 in such a manner that the dust separated from the air introduced through the air inlet 301 can be discharged.

According to an aspect of an embodiment, at least one cyclone 300 may include a body 303, an air inlet 301 and a dust outlet 302. The body 303 may form the external appearance of at least one cyclone 300. The air inlet 301 and the dust outlet 302 may be respectively formed at ends of the body 303.

The air inlet 301 may be larger in width than the dust outlet 302, so that the dust separation efficiency of at least one cyclone 300 can be maximized. That is, the dust outlet 302 may be formed to be smaller in width than the air inlet 301, so that centrifugal force of the air having the dust (i.e., the polluted air) can be increased. Greater centrifugal force may occur in the dust outlet 302 having a relatively smaller width.

The body 303 may include at least one of a planar surface and a curved surface. The curved surface may include at least one of a convex surface curved outward of at least one cyclone 300 and a concave surface curved inward of at least one cyclone 300.

At least one cyclone 300 may be formed in a conical shape. The air inlet 301 may be provided at one end of at least one cyclone 300, and the dust outlet 302 may be provided at the other end of at least one cyclone 300. A diameter of the air inlet 301 may be larger than that of the dust outlet 302. If at least one cyclone 300 is formed in a conical shape, the body 303 may be formed to have a planar surface. However, the shape of at least one cyclone 300 is not limited to the conical shape.

At least one cyclone 300 may be symmetrical on the basis of the symmetric axis S parallel to the longitudinal direction L of the at least one cyclone 300.

Figure 13:
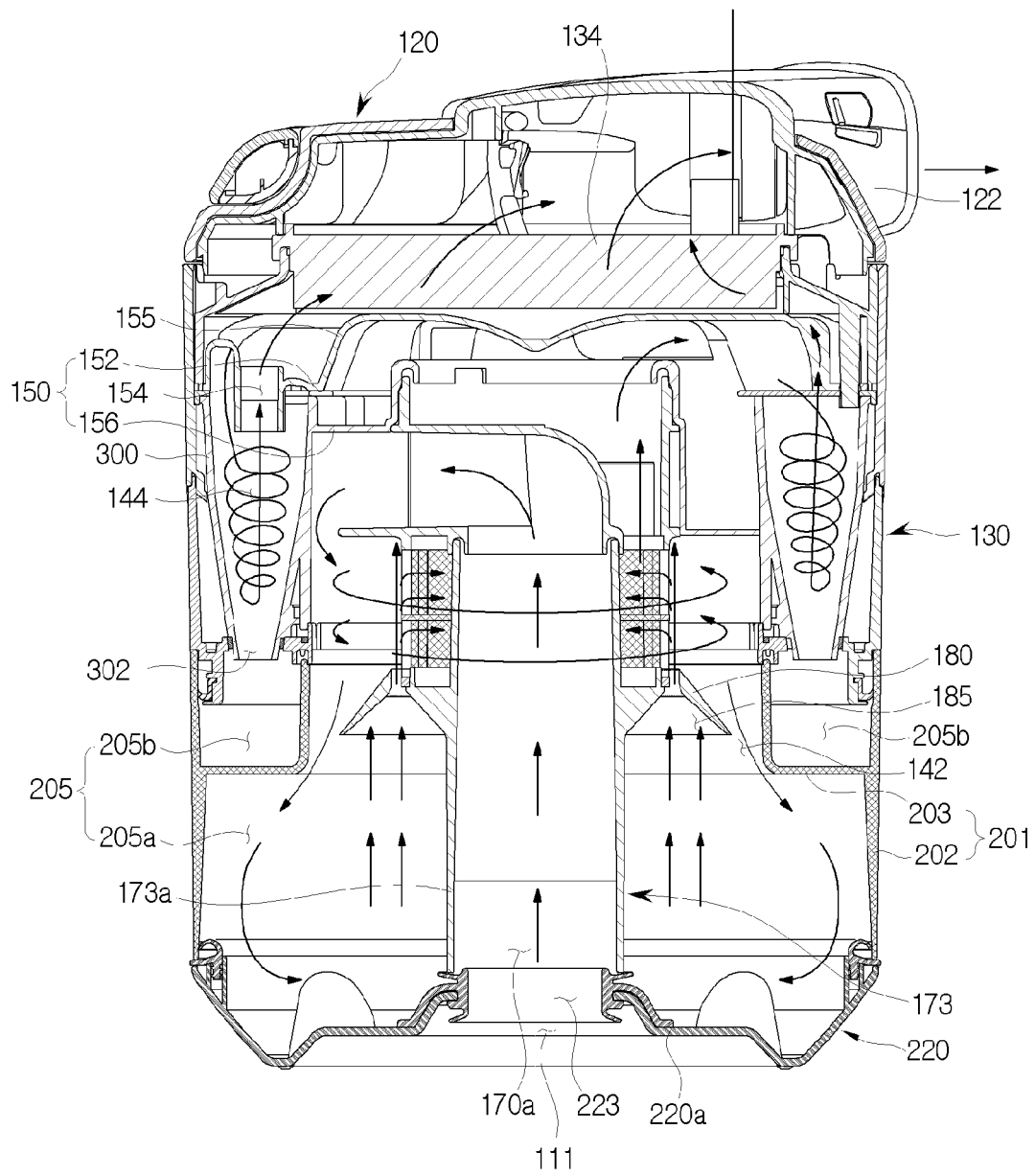
FIGS. 13 and 14 are views illustrating the air flow in a cyclone dust collection unit of the cleaner according to an embodiment.
Figure 14:
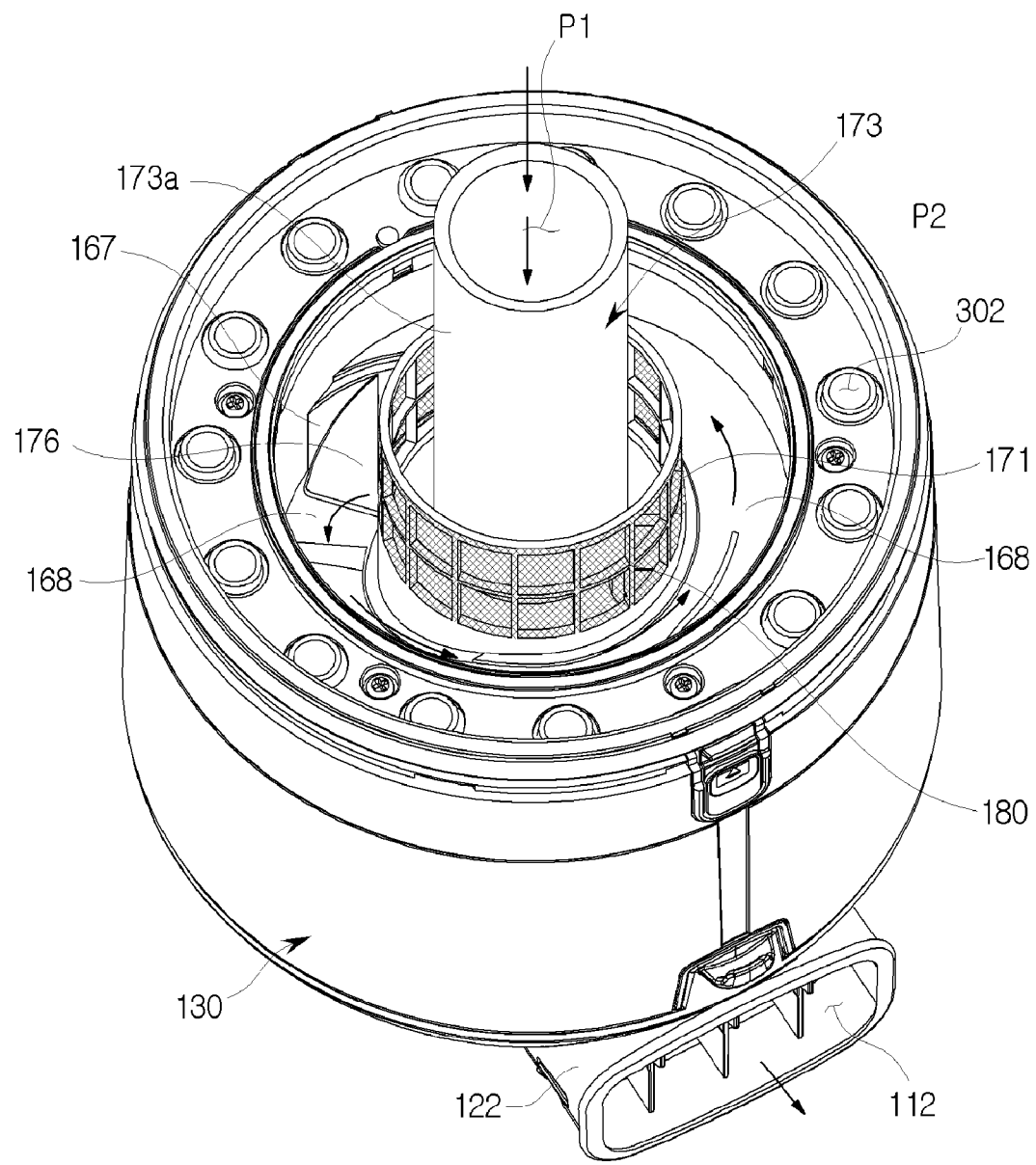

FIGS. 13 and 14 are views illustrating the air flow in a cyclone dust collection unit of the cleaner according to an embodiment. Reference characters not shown in FIGS. 13 and 14 refer, for example, to FIGS. 1 to 12.

As illustrated in FIGS. 13 and 14, air introduced from the suction unit 21 may flow into the dust collection unit 100 through the extension pipe 20 and the flexible hose 23. The suction port 220a may be provided below the dust collection unit 100, so that the air introduced from the flexible hose 23 may directly flow into the dust collection unit 100 without bypassing the side portion of the first cyclone chamber 42.

The air introduced into the dust collection unit 100 flows into the dust separation unit 170 through the introduction hole 170a communicating with the suction port 220a in the dust collection unit 100, and may be guided through the first flow passage P1 of the introduction pipe 173. After passing through the first flow passage P1, the air may be discharged to the first cyclone chamber 142 through the guide unit 174. The air discharged through the guide 184 may be spirally discharged by the discharge guide surface 184a. The air discharged through the guide unit 174 may be spirally discharged by the discharge guide surface 184a.

The swirling airflow may be generated by the airflow formation unit 166 during the air discharge process. A circumferential airflow may occur by the first airflow guide surface 167, and the vertical airflow may occur by the second airflow guide surface 168.

The air discharged from the airflow formation unit 166 may be spaced in a radial direction from the dust separation unit 170 by the airflow formation rib 176, resulting in formation of the rotating or swirling airflow. That is, the airflow formation rib 176 may prevent the air discharged through the guide unit 174 from directly flowing into the inner space 171a of the dust separation housing 171.

The swirling (or rotating) airflow may be formed in the first cyclone chamber 142 so that the dust may be centrifugally separated from the air. The air centrifugally separated from the air may be collected in the first dust collection chamber 205a. The air from which the dust may be centrifugally separated may flow into the air curtain generation member 180 through the second introduction unit 183.

The centrifugally separated air may pass through the second filter member 184 provided in the second introduction unit 183 of the air curtain generation member 180 so as to re-filter out the dust. The air separated from the dust flows into the air compression unit 185 after passing through the second filter member 184. The air compression unit 185 may compress the air due to a difference in size between the second introduction unit 183 and the air curtain discharge unit 181. The air compressed by the air compression unit 185 may generate the ascending airflow rising along the first introduction unit 171*a* in the air curtain discharge unit 181. The air curtain may be formed by the ascending airflow discharged from the air curtain discharge unit 181, so that the air curtain may prevent the swirling airflow including dust in the first cyclone chamber 142 from flowing into the inner space 171*b* of the dust separation housing 171 through the first introduction unit 171*a*. As a result, the dust may be prevented from being mixed with the air, resulting in increased dust separation efficiency.

The ascending airflow discharged from the air curtain discharge unit 181 may move to the inner space 171*b* of the dust separation housing 171 through the first introduction unit 171*a*. Since the air flowing into the inner space 171*b* of the dust separation housing 171 passes through the first filter member 172 provided in the first introduction unit 171*a*, the dust can be separated from the air. The first filter member 172 may be formed to filter out finer dust as compared to the second filter member 184.

At least one embodiment may separate the dust from the air through centrifugal force caused by the swirling airflow. The air sequentially passes through the second filter member 184 and the first filter member 172 so that the remaining fine dust unfiltered by such centrifugal separation can be separated from the air. The air from which the dust may be centrifugally separated may be blocked by the air curtain so that the air cannot pass through the first filter member 172, the dust separation efficiency may be be increased, and the filter member may be prevented from being clogged with dust or dirt so that the malfunction or faulty operation of the cleaner can be prevented.

The air flowing into the inner space 171*b* of the dust separation housing 171 through the first introduction unit 171*a* may be discharged to the discharge outlet 170*b* through the second flow passage P2. The air discharged to the discharge outlet 170*b* may move to the second cyclone chamber 144 through the guide pipe 155 of the cyclone body 150. The second cyclone chamber 144 may be provided in at least one cyclone 300, and the air forms the swirling airflow in the second cyclone chamber 144 so that centrifugal separation of the air may be completed.

During the centrifugal separation process, the dust may be discharged to the second dust collection chamber 205*b* through the dust outlet 302, e.g., dust discharge outlet, and the air separated from the dust may be discharged to an upper part of the cyclone body 150 through the discharge outlet 154.

The air discharged to an upper part of the cyclone body 150 may be discharged to the discharge port 122 through the filter member 134, so that the discharge air may be suctioned into the main body 10.

The cleaner 1 according to at least one embodiment may include a canister cleaner, an upright cleaner, and a handheld cleaner, without being limited thereto.

The cleaner according to at least one of the embodiments can increase dust filtering efficiency by improving a structure of the dust collection unit.

The cleaner according to at least one embodiment generates an air curtain in the dust collection unit to prevent pure air from being mixed with polluted air containing dust, resulting in increased dust filtering efficiency.

The cleaner according to at least one embodiment repeatedly filters dust using the swirling airflow and the filter member in the dust collection unit, resulting in increased dust filtering efficiency.

Although a few embodiments have been illustrated and described, it would be appreciated by those skilled in the art that changes may be made in these embodiments without departing from the principles and spirit of the invention, the scope of which is defined in the claims and their equivalents.

What is claimed is:

1. A cleaner comprising:
   a dust collection unit configured to separate dust from air through centrifugation, including:
      a dust collection case having an inlet through which air is introduceable and an outlet through which the air is dischargeable; and
      a cyclone assembly configured to separate dust from the air introduceable through the inlet, wherein the cyclone assembly includes:
         a dust separation housing having an inner space, configured to have a first introduction unit formed at a side surface thereof,
         an air curtain generation member couplable to the dust separation housing at a lower part of the first introduction unit, configured to include an air curtain discharge unit arranged at an upper end thereof and configured so that the air curtain discharge unit allows vertical airflow ascending along the first introduction unit to be discharged;
      a guide unit configured to allow air to be discharged to an inner space of the dust collection case; and
      an airflow formation unit provided at one side of the guide unit including an airflow formation rib and configured to discharge air from the guide unit in a form of a swirling airflow,
   wherein the air curtain generation member includes:
      a second introduction unit having a lower part configured to allow air to be introduced therethrough and formed to have a larger area than the air curtain discharge unit, and
      a filter member installed at the second introduction unit and configured to separate dust from air introduced into the air curtain generation member, and
   wherein the first introduction unit includes another filter member to separate dust from the air flowing into the dust separation housing.

2. The cleaner according to claim 1, wherein the air curtain generation member is formed to have a larger cross-section with decreasing distance to a bottom part thereof.

3. The cleaner according to claim 1, wherein the air curtain discharge unit is arranged at a position where the air curtain discharge unit encloses a lower end of the first introduction unit.

4. The cleaner according to claim 1, wherein the cyclone assembly is located in the dust collection case.

5. The cleaner according to claim 1, wherein the cyclone assembly includes:
   an introduction pipe provided in an inner space of the dust separation housing, to include a first flow passage therein, and
   wherein the guide unit provided at one side of the introduction pipe configured to allow air moved through the introduction pipe to be discharged to an inner space of the dust collection case.

6. The cleaner according to claim 5, wherein the cyclone assembly includes:

a second flow passage disposed between the introduction pipe and the dust separation housing, and a discharge outlet provided at one end of the dust separation housing, to communicate with the second flow passage, wherein the discharge outlet is formed to communicate with the outlet of the dust collection case.

7. A cleaner comprising:

a dust collection unit configured to separate dust from air introduceable through centrifugation, including:

a dust collection case having an inlet through which air is introduceable and an outlet through which the air is dischargeable, and a dust separation unit configured to centrifugally separate the dust from the air by generating a swirling airflow, wherein the dust separation unit includes:

a dust separation housing in which a first introduction unit configured to communicate with an inner space is provided at a side surface thereof, and an air curtain generation member, couplable to the dust separation housing configured to generate an ascending airflow rising along an outer circumference of the first introduction unit, wherein the air curtain generation member provides the ascending airflow to prevent the swirling airflow generated in the dust collection case from moving to the first introduction unit;

a guide unit configured to allow air to be discharged to an inner space of the dust collection case; and an airflow formation unit provided at one side of the guide unit including an airflow formation rib and configured to discharge air from the guide unit in a form of a swirling airflow, wherein the air curtain generation member includes:

a second introduction unit having a lower part allowing air to be introduced therethrough and formed to have a larger area than an air curtain discharge unit, and a filter member installed at the second introduction unit and configured to separate dust from air introduced into the air curtain generation member, and wherein the first introduction unit includes another filter member configured to separate dust from the air flowing into the dust separation housing.

8. The cleaner according to claim 7, wherein the dust separation unit is located in the dust collection case.

9. The cleaner according to claim 7, wherein one side of the air curtain generation member is couplable to the dust separation housing.

10. The cleaner according to claim 7, wherein the air curtain generation member includes:

an air compression unit formed therein, the air curtain discharge unit provided above the air compression unit, and the second introduction unit provided below the air compression unit, wherein a cross section of the second introduction unit is larger in size than the air curtain discharge unit.

11. The cleaner according to claim 10, wherein the air curtain generation member is formed to have a larger cross-section with decreasing distance to a bottom part thereof.

12. The cleaner according to claim 10, wherein the air curtain generation member is arranged at a position where the air curtain generation member encloses a lower end of the first introduction unit.

13. The cleaner according to claim 10, wherein the other filter member is configured to filter out finer dust than the filter member.

14. The cleaner according to claim 10, wherein each of the other filter member and the filter member includes a mesh.

15. A dust collection unit to separate dust from air through centrifugation comprising:

a dust collection case having an inlet through which air is introduceable and an outlet through which the air is dischargeable;

a cyclone assembly configured to separate dust from the air introduceable through the inlet, wherein the cyclone assembly includes:

a dust separation housing having an inner space, configured to have a first introduction unit formed at a side surface thereof, and an air curtain generation member couplable to the dust separation housing at a lower part of the first introduction unit, configured to include an air curtain discharge unit arranged at an upper end thereof and configured so that the air curtain discharge unit allows vertical airflow ascending along the first introduction unit to be discharged;

a guide unit configured to allow air to be discharged to an inner space of the dust collection case; and an airflow formation unit provided at one side of the guide unit including an airflow formation rib and configured to discharge air from the guide unit in a form of a swirling airflow, wherein the air curtain generation member includes:

a second introduction unit having a lower part configured to allow air to be introduced therethrough and formed to have a larger area than the air curtain discharge unit, and a filter member installed at the second introduction unit and configured to separate dust from air introduced into the air curtain generation member, wherein the first introduction unit includes another filter member to separate dust from the air flowing into the dust separation housing.

\* \* \* \* \*